March 10, 1942.  L. STRAUSS  2,275,999
FOLDING GOGGLES
Filed Sept. 14, 1940
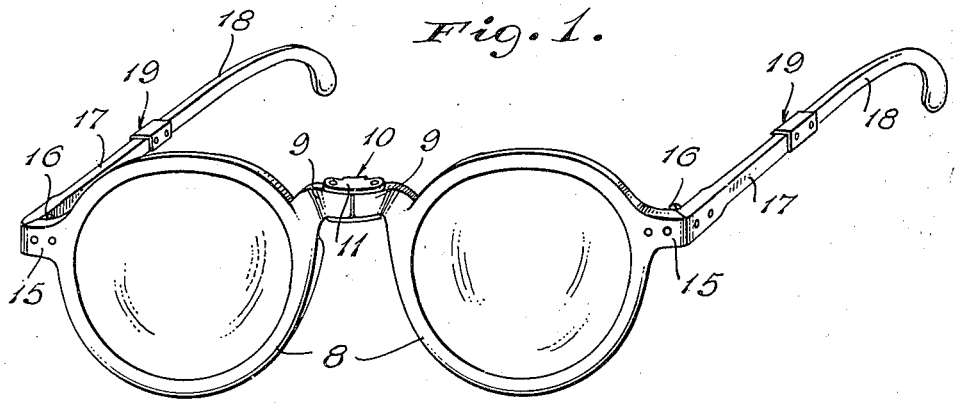
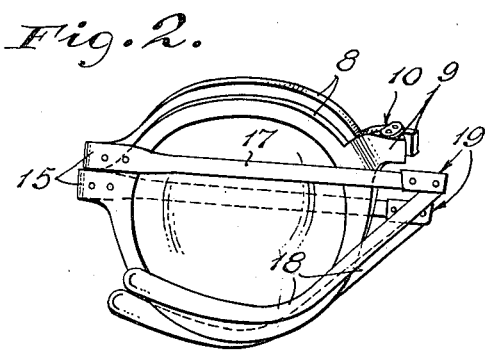
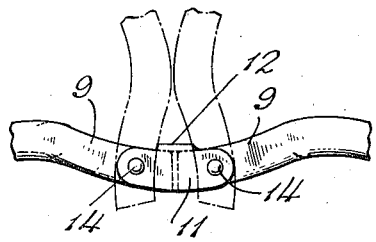
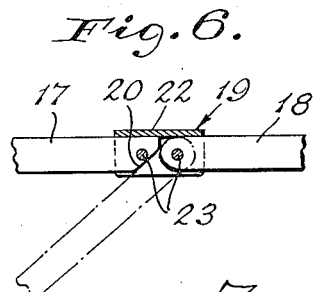
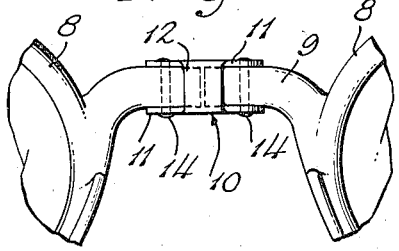
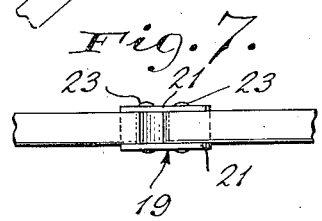
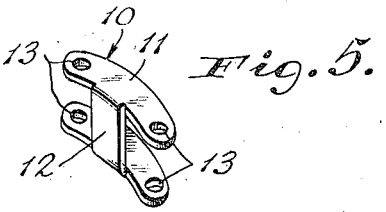
INVENTOR.
LEO STRAUSS
BY
ATTORNEYS Patented Mar. 10, 1942

2,275,999

UNITED STATES PATENT OFFICE 2,275,999

FOLDING GOGGLES

Leo Strauss, Far Rockaway, N. Y., assignor to American Spectacle Co. Inc., New York, N. Y., a corporation of New York Application September 14, 1940, Serial No. 356,729

3 Claims. (Cl. 88—41)

This invention relates to improvements in goggles and has particular reference to goggles of the folding type.

An object of the invention is to provide improved goggles of simple and practical construction wherein separable bridge and temple sections are hingedly joined together so as to enable the goggles to be compactly folded when not in use, and wherein the connector or coupling elements employed to join said sections may be inexpensively produced to thereby reduce the cost of manufacture of the goggles to a minimum.

The above and other objects will appear more clearly from the following detailed description when taken in connection with the accompanying drawing which illustrates a preferred embodiment of the inventive idea.

In the drawing:

Figure 1 is a perspective view of the goggles constructed in accordance with the invention shown in extended or operative position.

Figure 2 is a similar view of the goggles in folded position.

Figure 3 is a fragmentary top plan view illustrating the bridge portion of the goggles and connector therefor which enables the two frame sections of the goggles to be swung to folded position, as indicated in dotted lines.

Figure 4 is a fragmentary rear elevation of the bridge portion of the goggles.

Figure 5 is a perspective view of the connector employed to join the bridge sections of the goggles.

Figure 6 is a fragmentary longitudinal section taken through one of the temples of the goggles showing the coupling for the meeting ends of the sections of said temples, the dotted lines indicating the folding portion of the rear or ear bow section, and Figure 7 is a bottom plan view of the temple sections and coupling therefor.

Referring more particularly to the accompanying drawing, the frame of the goggles, which may be made of any desirable material, is shown as comprising a pair of eye wires 8 in which the lenses of the goggles are mounted. These eye wires are provided with complemental and separable bridge sections 9 which are bowed forwardly, as best shown in Figure 3, and which are hingedly joined together by a connector, generally indicated by the numeral 10, so as to enable the eye wires to be folded into the position of Figure 2. In accordance with one of the features of the present invention, said connector is stamped from a piece of light metal to form two opposed straps 11 joined along their inner or rear edges intermediate the ends thereof by transverse connecting strap 12 which forms a stop for the meeting extremities of the bridge sections to retain the same in alignment and limit forward swinging thereof when the goggles are in use. The straps 11 are adapted to receive therebetween the meeting ends of the two bridge sections 9 and to engage the upper and lower edges thereof, and said straps are curved longitudinally to conform to the curvature of the bowed portions of said bridge sections. The transverse strap 12 is disposed to the rear of the bridge sections so that it will be invisible when the goggles are being worn. The two straps 11 are provided at their ends with vertically aligned openings 13 for receiving pintles 14 which extend through the bridge sections 9 so as to form the hinge connection between said sections which enable the eye wires 8 to be swung from operative to folded positions.

Each eye wire 8 is provided with an end piece 15 to which is pivotally connected at 16 the front section 17 of a foldable temple, the rear or ear bow section 18 of which is joined to said front section by a coupling, generally indicated by the numeral 19. As best shown in Figure 6, the rear or meeting end of the front section 17 of the temple is cut away on a diagonal line, as indicated at 20, to reduce the thickness of the section at its extremity and thus enable the rounded meeting end of the rear section 18 to be swung from its extended full line position to the folded dotted line position thereof when the goggles are folded, as in Figure 2, said end 20 also providing a stop against which the section 18 abuts to limit its movement to folding position.

The coupling 19 is, like the connector 10, also formed as a stamping for purposes of economy in manufacture, and is made of channeled formation to provide side walls 21 and a top wall 22. The width of said coupling is such as to receive therebetween the meeting ends of the temple sections 17, 18 and when in position on said sections, the intermediate wall 22 overlaps said meeting ends and engages the upper edges of said temple sections so as to maintain the same in horizontal alignment when the temple is in operative position. Pintles 23 extend through the side wall of the coupling and of the meeting ends of the sections 17, 18 to pivotally connect the same together.

What is claimed is:

1. Folding goggles comprising a pair of eye wires having separable bridge sections, a connector for said sections hingedly joining the same together, said connector comprising opposed straps engaging the upper and lower edges of said bridge sections, pivots connecting said straps with said bridge sections, a transverse connecting strap joining the rear edges of said opposed straps and disposed in overlapping relation to the ends of said bridge sections when the latter are in operative position, said connecting strap constituting a stop engageable by said bridge sections to limit their forward swinging movements, and temples connected to said eye wires.

2. Folding goggles comprising a pair of eye wires having separable bridge sections, a connector for said sections hingedly joining the same together, said connector comprising opposed straps having an unobstructed space therebetween for receiving the ends of said bridge sections, said straps engaging the upper and lower edges of said bridge sections and the forward edges of said straps terminating at and being coincidental with the forward edges of said sections, pivots joining said straps with said bridge sections, a transverse connecting strap of less width than the lengths of said opposed straps joining the rear edges of the latter intermediate their ends and in overlapping relation to the meeting ends of said bridge sections, said connecting strap constituting a stop engageable by said sections to limit their forward swinging movements, and temples connected to said eye wires.

3. Folding goggles comprising a pair of separable eye wires each having a bridge section, means to hingedly connect said bridge sections, foldable temples hinged to said eye wires and each comprising pivotally connected front and rear sections having meeting ends, the end of one of said sections being cut away to form a diagonal surface constituting a stop against which an edge of the other section of said temple abuts when the sections are moved to folded position, a coupling straddling the meeting ends of said sections, and pintles joining said coupling with said sections to pivotally connect the same.

LEO STRAUSS.